June 21, 1949.  W. A. ASHTON  2,473,935
INDEPENDENT LEVERAGE CHUCK
Filed May 18, 1948  2 Sheets-Sheet 1
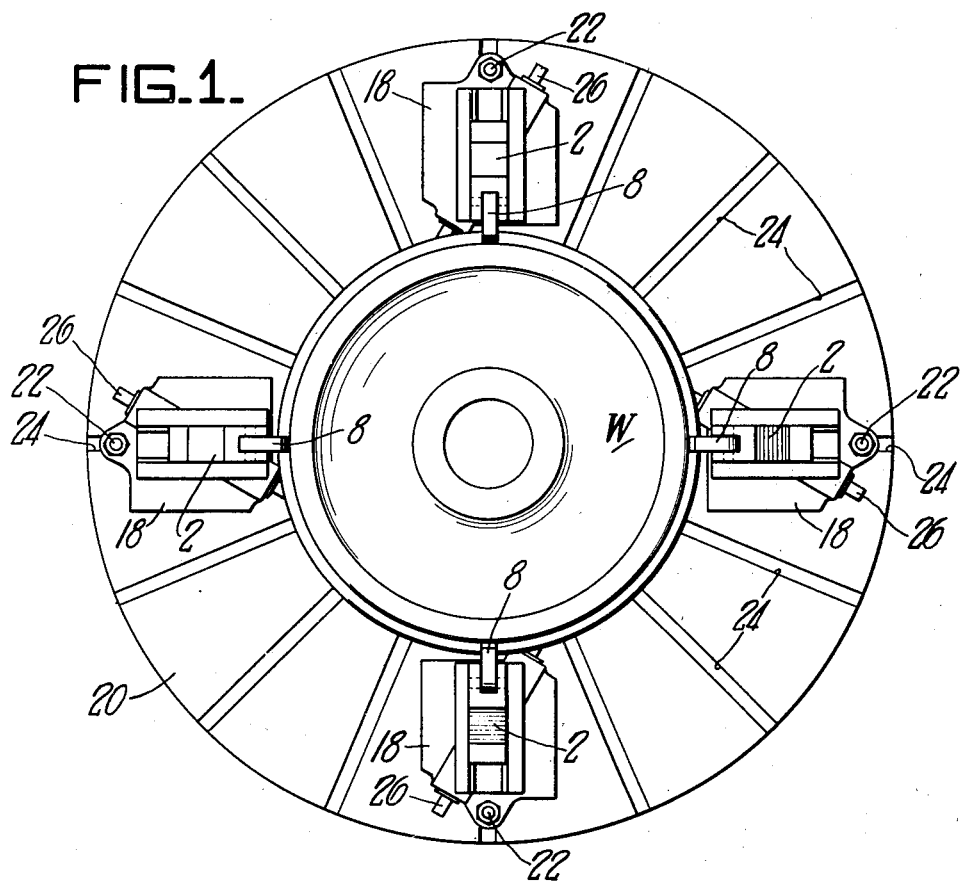
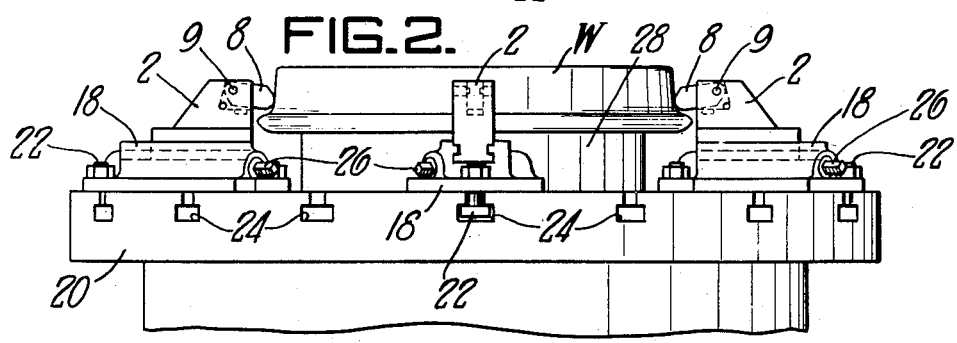
*INVENTOR:*
WILLIAM A. ASHTON,
BY:
Donald G. Dalton
*his Attorney.*

June 21, 1949.  W. A. ASHTON  2,473,935
INDEPENDENT LEVERAGE CHUCK
Filed May 18, 1948  2 Sheets-Sheet 2
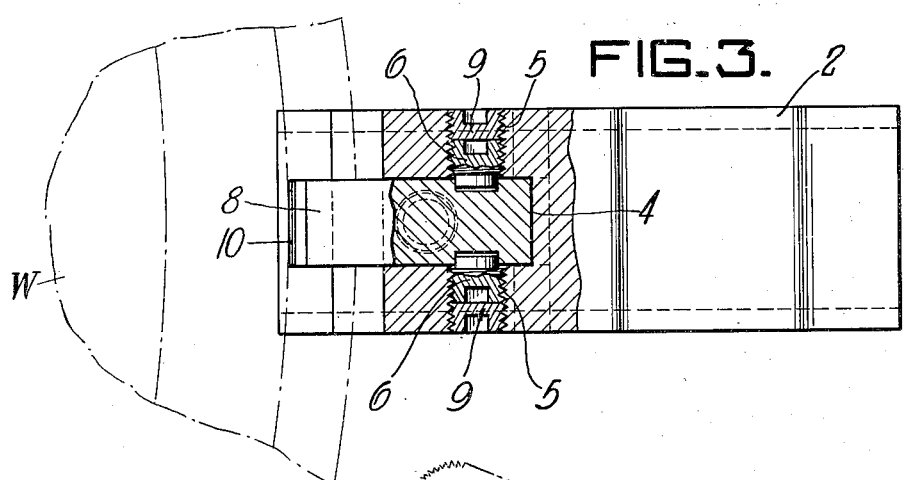
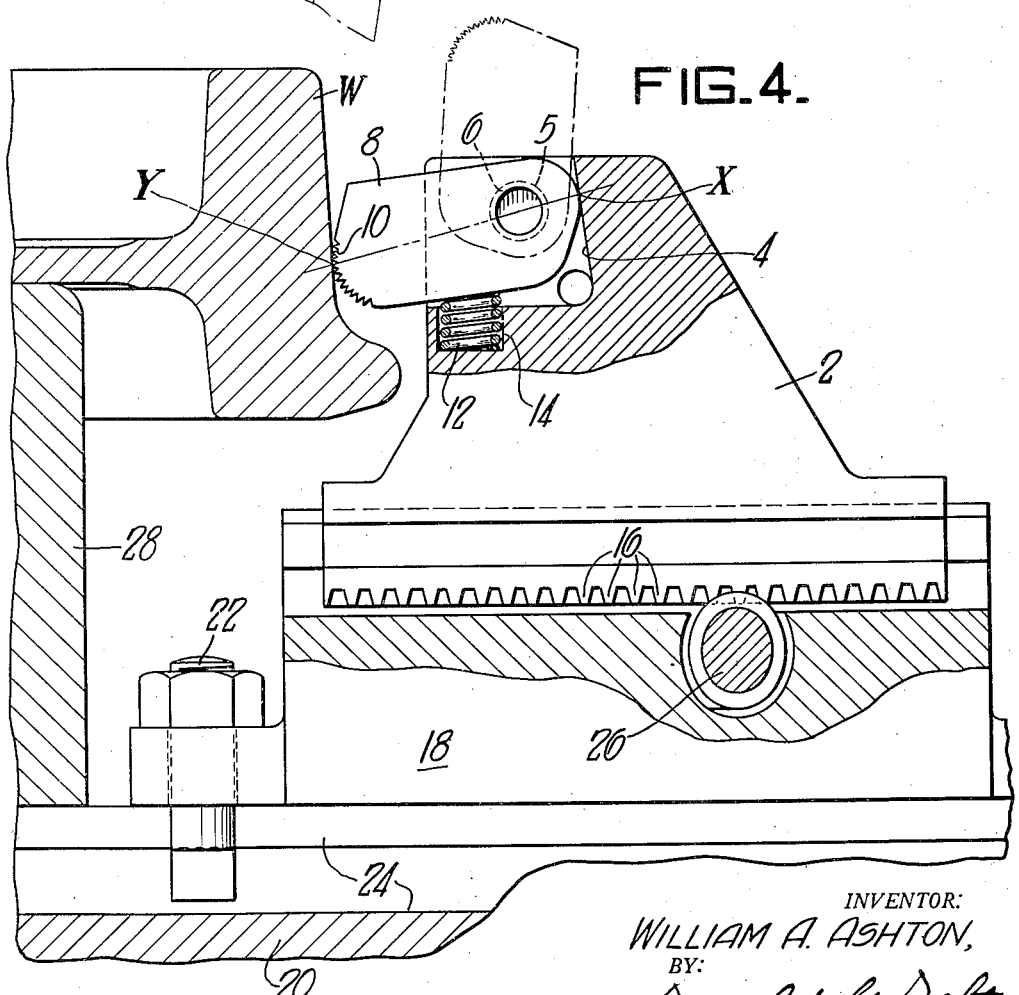
INVENTOR:
WILLIAM A. ASHTON,
BY:
Donald G. Dalton
his Attorney.

Patented June 21, 1949

2,473,935

UNITED STATES PATENT OFFICE 2,473,935

INDEPENDENT LEVERAGE CHUCK

William A. Ashton, Pittsburgh, Pa., assignor to Carnegie-Illinois Steel Corporation, a corporation of New Jersey Application May 18, 1948, Serial No. 27,673

2 Claims. (Cl. 279—123)

This invention relates to a chuck and more particularly to a chuck having a plurality of independent levers for holding a workpiece in centered position on the work table of a machine tool.

Prior to my invention, considerable time was consumed in manipulating workpieces and properly securing them to the work table. The principal cause of this time consumption was the necessity of manually adjusting bolts and U-clamps in order to align and secure the workpiece on the table.

It is, therefore, an object of my invention to provide an independent leverage chuck which eliminates the necessity of using table bolts and U-clamps and effects a considerable reduction in set-up time.

This and other objects will become more apparent after referring to the following specification and attached drawings, in which:

Figure 1 is a top plan view showing my invention in working position;

Figure 2 is a side elevation of the arrangement shown in Figure 1;

Figure 3 is an enlarged top view, partially in section, of a detail of the invention; and Figure 4 is a side elevational view, partly in section, of Figure 3.

Referring more particularly to the drawings, reference numeral 2 indicates a main chuck block having a recess 4 in its surface. Aligned threaded openings 5 extend from the recess 4 to each side of block 2. A pivot point set screw 6 is provided in each opening with its end extending into the recess 4 to pivotally support a chuck jaw 8. Each of the screws 6 is backed up and locked in place by a flat end, safety screw 9. A serrated contact surface 10 is provided at the lower front end of jaw 8. A helical spring 12 projects from a hole 14 in the bottom surface of notch 4. A series of teeth 16 projects from the bottom surface of chuck block 2. As shown in Figures 1, 2 and 4, a chuck block 2 is mounted in the usual manner on a chuck body 18. Four such chuck bodies are equally spaced about a work table 20 and are affixed thereto by bolts 22 projecting from T-slots 24 in the surface of the work table. Extending diagonally through each chuck body 18 is a screw 26, the threads of which engage the teeth 16 on the bottom surface of chuck block 2, thereby enabling the chuck block to be adjusted toward or away from the center of work table 20. Rigidly attached to the center of table 20 is a parallel plate 28 which is of sufficient thickness to maintain the workpiece at the desired height for machining.

In operation, a workpiece W, which is illustrated as a wheel, is centered on the parallel plate 28. While the workpiece W is being centered on the parallel plate 28, the jaws 8 are turned up to the vertical position shown in broken lines in Figure 4. After the workpiece W has been centered, the chuck jaws 8 are dropped to horizontal position and screws 26 are turned to advance the chuck blocks 2 toward the workpiece until the serrated contact faces 10 engage the workpiece W. In this position the point of contact between jaw 8 and chuck body 2, shown at X in Figure 4, is above the contact point Y between jaw 8 and workpiece W. This arrangement causes the resultant force to be downward as well as inward, and thus holds the workpiece W securely in position for machining. Spring 12, in the bottom of notch 4, is compressed by the jaw 8 as the jaw is moved to its gripping position shown in full lines in Figures 2 and 4. When the chuck 2 is moved away from the workpiece the compressed spring 12 returns the chuck jaw 8 to a horizontal position.

Once the set-up is made for a particular type of workpiece, additional workpieces can be readily placed in or removed from position by retracting two of the chucks 2 a slight amount and manually raising all of the jaws 8 to their vertical positions, thereby providing sufficient clearance to easily remove the workpiece or place a new workpiece in position.

While one embodiment of my invention has been shown and described it will be apparent that other adaptations and modifications may be made without departing from the scope of the following claims:

I claim:

1. A chuck comprising a chuck body having a recess therein, a chuck jaw pivotally mounted in said recess, the rear end of said jaw bearing against the rear surface of said recess at a point between the pivot and the open end of said recess, and a serrated contact face on the front end of said jaw at a point diametrically opposite the jaw bearing point.

2. A chuck comprising a chuck body having a recess therein, a spring projecting from a hole in the bottom of said recess, a chuck jaw pivotally mounted in said recess with its bottom surface adapted to bear against said spring, the upper rear end of said jaw bearing against the vertical rear surface of said recess, and a serrated contact face on the lower front end of said jaw.

WILLIAM A. ASHTON.

REFERENCES CITED

The following references are of record in the file of this patent:

UNITED STATES PATENTS

| Number | Name | Date |
|---|---|---|
| 470,370 | Westcott | Mar. 8, 1892 |
| 881,373 | Burt | Mar. 10, 1908 |
| 999,248 | Otto | Aug. 1, 1911 |
| 1,562,230 | Guttly | Nov. 17, 1925 |